United States Patent [19]

Laimböck

[11] Patent Number: 4,706,618
[45] Date of Patent: Nov. 17, 1987

[54] TWO STROKE CYCLE INTERNAL COMBUSTION ENGINE

[75] Inventor: Franz Laimböck, Graz, Austria

[73] Assignee: Steyr-Daimler-Puch Aktiengesellschaft, Vienna, Austria

[21] Appl. No.: 928,264

[22] Filed: Nov. 6, 1986

[30] Foreign Application Priority Data

Nov. 6, 1985 [AT] Austria ............................ 3198/85

[51] Int. Cl.⁴ ............................................. F02B 33/04
[52] U.S. Cl. ................................ 123/73 AA; 123/557
[58] Field of Search .......... 123/73 A, 73 AA, 73 B, 123/74 A, 41.35, 557

[56] References Cited

U.S. PATENT DOCUMENTS

| | | | |
|---|---|---|---|
| 2,578,380 | 12/1951 | Teegen | 123/73 A |
| 3,190,271 | 6/1965 | Gudmundsen | 123/73 B |
| 3,881,454 | 5/1975 | Jaulmes | 123/73 B |
| 3,905,341 | 9/1975 | Boyesen | 123/73 A |
| 3,993,030 | 11/1976 | Jaulmes | 123/73 B |
| 4,142,487 | 3/1979 | Somraty | 123/73 B |
| 4,204,489 | 5/1980 | Onishi | 123/73 A |
| 4,290,394 | 9/1981 | Frank et al. | 123/73 A |
| 4,450,794 | 5/1984 | Pailler | 123/74 A |
| 4,579,093 | 4/1986 | Eanes | 123/41.35 |

FOREIGN PATENT DOCUMENTS

| | | | |
|---|---|---|---|
| 168709 | 9/1959 | Fed. Rep. of Germany | 123/73 B |
| 0170823 | 10/1983 | Japan | 123/73 B |

*Primary Examiner*—Craig R. Feinberg
*Assistant Examiner*—David A. Okonsky
*Attorney, Agent, or Firm*—Marmorek Guttman & Rubenstein

[57] ABSTRACT

In a two stroke cycle internal combustion engine comprising a scavenged crankcase and a fuel injection nozzle (10), the formation of a more satisfactory mixture is desired and the use of a piston having smaller dimensions is to be permitted and this is to be accomplished substantially without an increase of the technical structure expenditure. For this purpose the nozzle (10) discharges a jet of fuel from the crankcase side into the interior of the hollow piston (5) so that at least part of the discharged fuel jet impinges on the piston head (13) as the piston moves toward the crankcase (1).

7 Claims, 2 Drawing Figures

TWO STROKE CYCLE INTERNAL COMBUSTION ENGINE

BACKGROUND OF THE INVENTION

1. Field of the Invention

This invention relates to a two stroke cycle internal combustion engine comprising a scavengeable crankcase and a fuel injection nozzle.

2. Description of the Prior Art

In known two stroke cycle internal combustion engines having a fuel injection nozzle the latter discharges a fuel jet directly into the combustion chamber. But that so-called direct fuel injection has the disadvantage that only a short time is available for the injection of the fuel and for the mixing of the fuel with the intake air, particularly when the engine is operated at high speed. As a result, a satisfactory mixture is not obtained so that the operation of the engine is also unsatisfactory and more pollutants are emitted. Besides, there is a tendency of coke to deposit on the nozzle tip, which in most cases is disposed in the combustion chamber, and such coke deposits give rise to difficulties which cannot be overcome in practice.

SUMMARY OF THE INVENTION

For this reason it is an object of the invention to avoid said disadvantages and to provide a two stroke cycle internal combustion engine which is of the kind described first hereinbefore and in which a highly satisfactory mixture is formed and pistons having smaller dimensions, particularly a thinner piston head, can be used. This is to be accomplished substantially without a substantial increase of the structural expenditure.

The object set forth is accomplished in accordance with the invention in that the jet of fuel discharged by the nozzle is discharged into the interior of the hollow piston from the crankcase side in such a direction that at least part of the fuel jet impinges the piston head during the movement of the piston toward the crankcase.

In accordance with the invention a direct injection of fuel and the disadvantages involved therein are avoided and a much more satisfactory mixture is formed because a longer time is available for the formation of the mixture and at least part of the fuel jet impinges on the piston head, which is that part of the engine which is at the highest temperature during operation. Another advantage afforded by the spraying of fuel on the piston head resides in that energy corresponding to the latent heat of evaporation is extracted from the piston head so that the latter is cooled and may be much thinner than before without a danger of a burnthrough. Owing to the thinner piston head, the inertial forces exerted on the power-transmitting means are favorably reduced. The fuel which is injected into the interior of the hollow piston will obviously cool also the piston pin and the connecting rod eye.

The nozzle might be disposed laterally of the crankwebs above the mainshaft bearings of the crankshaft. But it will be much more favorable to install the nozzle in the side wall of the cylinder and to form the piston skirt with a window adjacent to the nozzle because that arrangement will result in an improved cooling of the piston head, piston pin and connecting rod eye.

Within the scope of the invention, that wall portion of the cylinder which is diametrically opposite to the exhaust port of the cylinder is formed on the inside with at least one transfer channel in that region which is swept by the window of the moving piston and said transfer channel rises steeply toward the cylinder head.

In port-controlled two stroke cycle internal combustion engines there is generally a risk that at least part of the mixture coming from the crankcase flows through the exhaust port directly into the exhaust passage along a short-circuit path and does not effect a reverse scavenging in the cylinder or in the combustion chamber. A short circuit flow of the rich mixture will reliably be avoided if that wall portion of the cylinder that is diametrically opposite to the exhaust port is formed with a transfer channel which rises steeply toward the cylinder head. As a result, a very lean mixture will be obtained in a zone which is adjacent to the exhaust port of the cylinder.

That result can be further improved and a flow of rich mixture into the crankcase rather than directly into the cylinder chamber can be avoided in that a transverse partition is provided, which separates at least a major portion of the interior of the piston from the crankcase and is formed with an aperture through which the connecting rod extends.

In most conventional two stroke cycle internal combustion engine the air intake port which is adapted to communicate with the crankcase is provided in that side wall portion of the cylinder which is diametrically opposite to the exhaust port. But in accordance with the invention the transfer channel is formed and/or the nozzle is installed in said side wall portion. For this reason the air intake port which is adapted to communicate with the crank case is formed in the same side wall portion of the cylinder that is formed with the exhaust port and the air intake port is disposed under the exhaust port.

During an operation of two stroke cycle internal combustion engines at very high speed, the inertia of the nozzle may prevent an injection of the desired quantity of fuel in the time which is available for such injection. In order to avoid such an undesired occurrence, the invention provides a second nozzle, which is operable in alternation with the first nozzle and with a phase displacement corresponding to a crank angle of 360° relative to the first nozzle and discharges a fuel jet into teh same region as the first nozzle.

DETAILED DESCRIPTION OF THE PREFERRED EMBODIMENT

Figure 1:
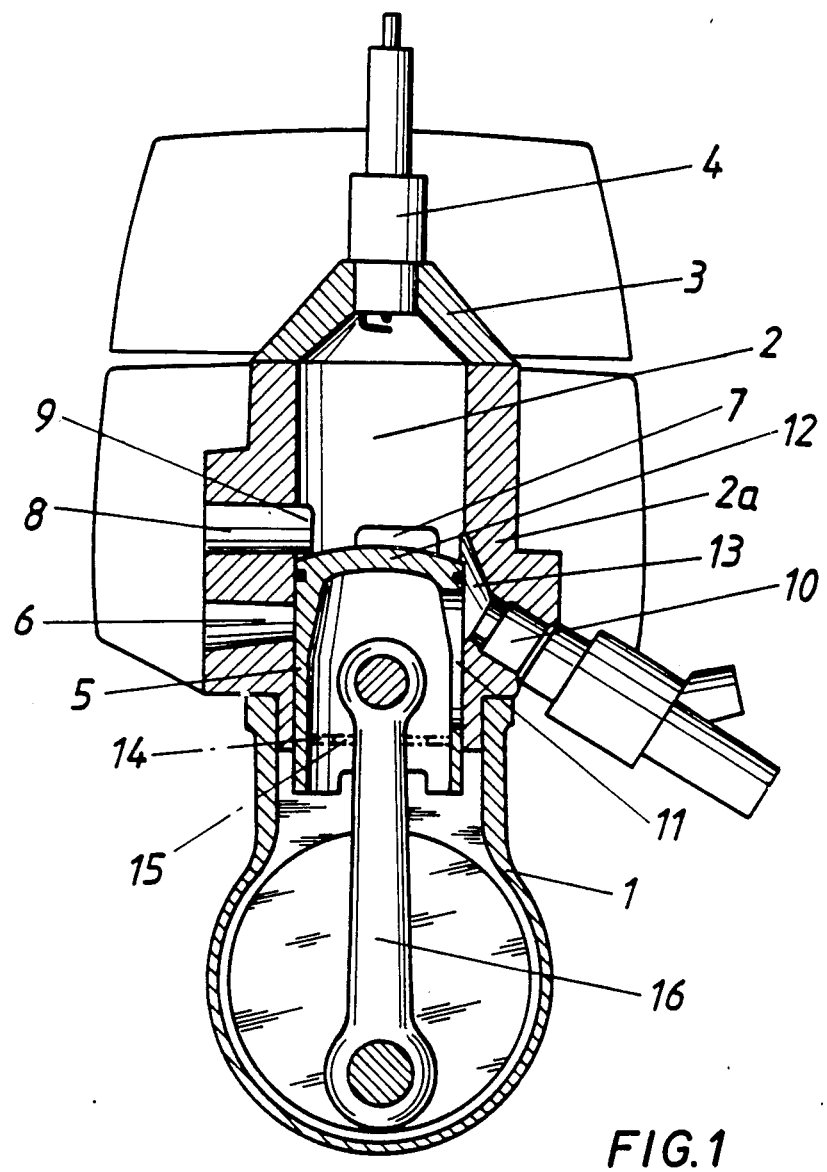
FIG. 1 is a simplified sectional view showing an illustrative embodiment of a two stroke cycle internal combustion engine in accordance with the invention, which engine has a scavenged crankcase.
Figure 2:
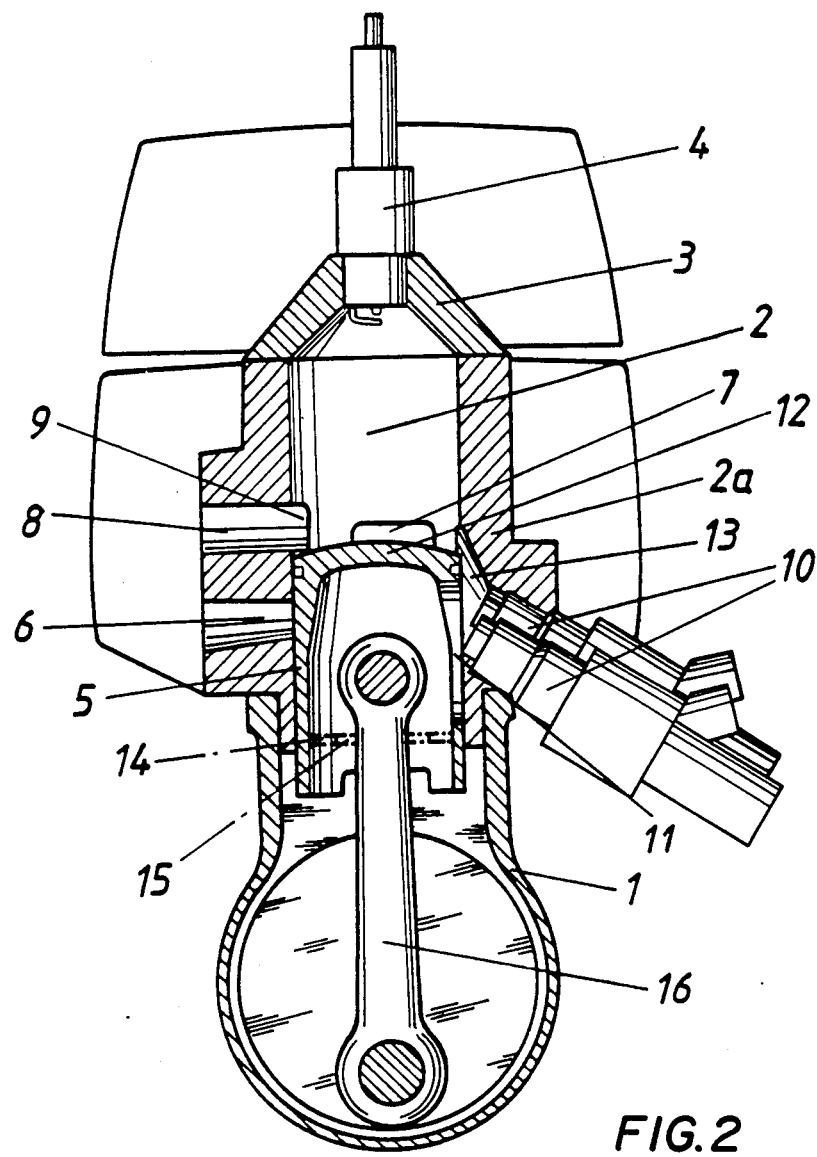
FIG. 2 is a view similar to FIG. 1 showing another embodiment which includes a second fuel nozzle.

As shown in FIG. 1, the two stroke cycle internal combustion engine comprises a crankcase 1, a cylinder 2 and a cylinder head 3, which is provided with a spark plug 4. During its upward stroke, the hollow piston 5 sucks air through the intake port 6. That air flows into and is precompressed in the crankcase 1 and then flows through the transfer channel 7 into the combustion chamber, which communicates through an exhaust port 9 in the cylinder 2 with the exhaust passage 8. A fuel injection nozzle 10 is installed in that portion 2a of the cylinder which is diametrically opposite to the exhaust port 9. Said nozzle 10 is arranged to discharge a fuel jet in such a direction that at least part of the discharged fuel enters the piston 5 through a window 11 formed in the skirt of the piston 5 and impinges on the inside of the piston head 12. Another embodiment of this invention, depicted in FIG. 2, provides a second nozzle 10 which is operable in alternation with the first nozzle 10. The cylinder portion 2a which is diametrically opposite to the exhaust port 9 is formed with a transfer channel 13 in that region which is swept by the window 11 during the movement of the piston. That transfer channel 13 rises steeply toward the cylinder head 3. A transverse partition 14 indicated in phantom may be provided in the piston to separate a major portion of the interior of the piston from the crankcase. Said transverse partition 14 is formed with an aperture 15 through which the connecting rod 16 extends.

I claim:

1. In a two stroke cycle internal combustion engine comprising
   a cylinder;
   a cylinder head joined to said cylinder at one end thereof;
   a hollow piston, which is axially movable in said cylinder and has at one end a piston head, which on one side defines with said cylinder and said cylinder head a combustion chamber and on an opposite side defines the interior of said piston,
   a scavengeable crankcase, which is joined to the other end of said cylinder and open to the opposite side of said piston and is adapted to communicate with said combustion chamber during said movement of said piston, and
   a fuel injection nozzle for discharging of a jet of fuel during a predetermined movement of said piston into said crankcase,
   the improvement residing in that said nozzle is arranged to be disposed below a plane defined by said opposite side of said piston head during at least part of said predetermined movement of said piston and is arranged to discharge said jet of fuel into said interior of said piston in such a direction that at least part of said fuel impinges on said opposite side of said piston head.

2. The improvement set forth in claim 1, wherein said nozzle is arranged to be disposed below said plane defined by said opposite side of said piston head throughout said predetermined movement of said piston.

3. The improvement set forth in claim 1, wherein said piston has a skirt formed with a window which is arranged to sweep a predetermined portion of said cylinder during the movement of said piston in said cylinder and
   said nozzle is mounted in said predetermined portion of said cylinder and adapted to discharge said jet of fuel through said window.

4. The improvement set forth in claim 3 as applied to an internal combustion engine in which said cylinder is formed in a second portion thereof with an exhaust port that is arranged to communicate with said combustion chamber during the movement of said piston in said cylinder, wherein
   said predetermined portion of said cylinder is diametrically opposite to said second portion and
   said predetermined portion of said cylinder is formed on the inside thereof at least one transfer channel which rises steeply toward said cylinder head.

5. The improvement set forth in claim 1 as applied to an internal combustion engine comprising a connecting rod which extends from said crankcase into the interior of said piston, wherein
   said piston comprises a partition, which separates at least a major portion of the interior of said piston from said crankcase and is formed with an aperture and
   said connecting rod extends through said aperture.

6. The improvement set forth in claim 3, as applied to an internal combustion engine in which said cylinder is formed with an exhaust port that is arranged to be exposed to said combustion chamber during the movement of said piston in said cylinder and with an air intake port that is arranged to communicate with said crankcase during the movement of said piston in said cylinder, wherein
   said air intake port and said exhaust port are angularly spaced from said predetermined portion of said cylinder and
   said air intake port is disposed under said exhaust port.

7. The improvement set forth in claim 1, wherein a second fuel injection nozzle is provided, both of said fuel injection nozzles being adapted to inject a jet of fuel into the same region of the interior of said piston, and
   said nozzles being operable in alternation to discharge said jets of fuel with a phase displacement corresponding to a crank angle of 360°.

* * * * *